US012177895B2

(12) United States Patent
Jiang et al.

(10) Patent No.: US 12,177,895 B2
(45) **Date of Patent: *Dec. 24, 2024**

(54) AVAILABILITY INDICATION FOR UPLINK LOCATION MEASUREMENT REPORT FEEDBACK

(71) Applicant: Intel Corporation, Santa Clara, CA (US)

(72) Inventors: Feng Jiang, Santa Clara, CA (US); Chittabrata Ghosh, Fremont, CA (US); Qinghua Li, San Ramon, CA (US); Jonathan Segev, Sunnyvale, CA (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,388

(22) Filed: Mar. 31, 2023

(65) Prior Publication Data

US 2023/0247665 A1 Aug. 3, 2023

Related U.S. Application Data

(63) Continuation of application No. 17/193,086, filed on Mar. 5, 2021, now Pat. No. 11,818,756, which is a continuation of application No. 16/168,454, filed on Oct. 23, 2018, now abandoned.

(60) Provisional application No. 62/575,923, filed on Oct. 23, 2017.

(51) Int. Cl.

*H04W 72/04* (2023.01)
*H04W 4/02* (2018.01)
*H04W 24/10* (2009.01)
*H04W 64/00* (2009.01)
*H04W 72/0446* (2023.01)
*H04W 74/06* (2009.01)

(52) U.S. Cl.

CPC .......... *H04W 74/06* (2013.01); *H04W 4/025* (2013.01); *H04W 24/10* (2013.01); *H04W 64/00* (2013.01); *H04W 72/0446* (2013.01)

(58) Field of Classification Search

None

See application file for complete search history.

(56) References Cited

U.S. PATENT DOCUMENTS 11,818,756 B2 * 11/2023 Jiang .................... H04W 24/10

* cited by examiner

*Primary Examiner* — Willie J Daniel, Jr.

(74) *Attorney, Agent, or Firm* — Eversheds Sutherland (US) LLP

(57) ABSTRACT

This disclosure describes systems, methods, and devices related to uplink location measurement report (LMR) feedback. A device may perform availability window negotiation during a negotiation phase of a location determination associated with a first initiating device of one or more initiating devices. The device may determine a status of a first LMR associated with the first initiating device. The device may cause to send a polling request to one more initiating devices during a first availability window. The device may identify a polling response from at least one of the one or more initiating devices. The device may perform one or more sounding measurements with the at least one of the one or more initiating devices during a measurement phase. The device may cause to send a trigger frame to the at least one of the one or more initiating devices.

13 Claims, 10 Drawing Sheets

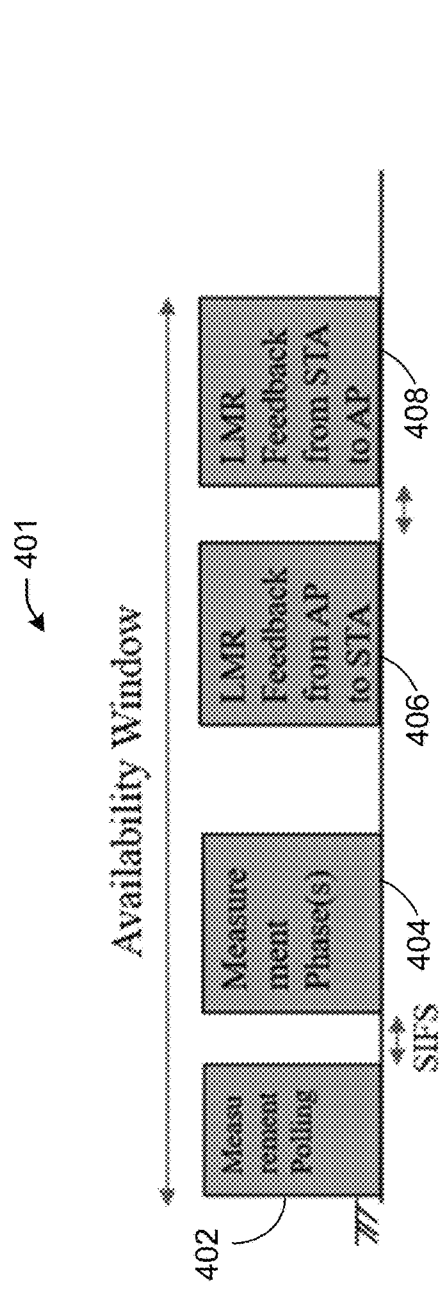
FIG. 4A
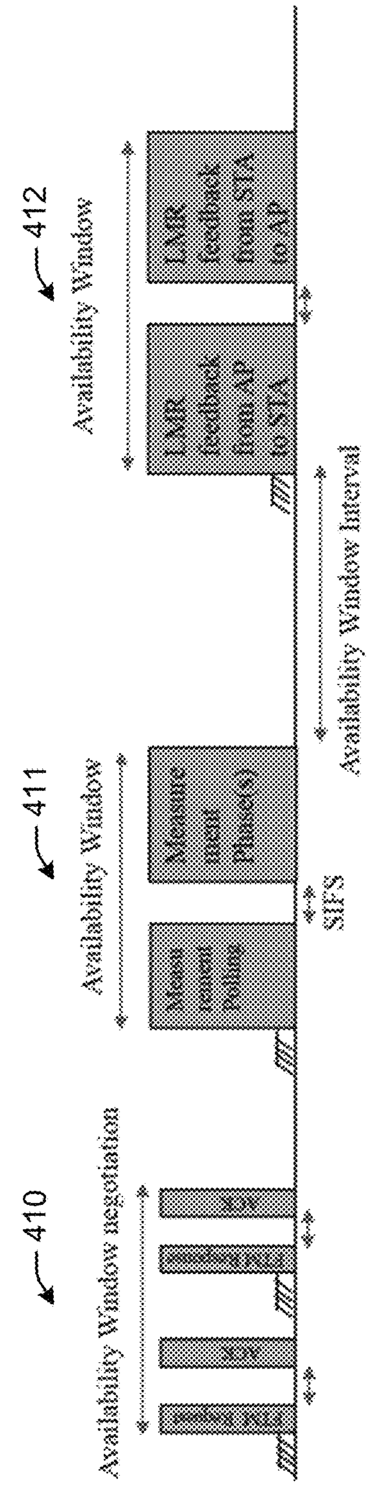
FIG. 4B
FIGs. 4A-4B

500

AVAILABILITY INDICATION FOR UPLINK LOCATION MEASUREMENT REPORT FEEDBACK

CROSS-REFERENCE TO RELATED APPLICATIONS

This application is a continuation of U.S. Non-Provisional application Ser. No. 17/193,086, filed Mar. 5, 2021, which is a continuation of U.S. Non-Provisional application Ser. No. 16/168,454, filed Oct. 23, 2018, which claims the benefit of U.S. Provisional Application No. 62/575,923, filed Oct. 23, 2017, the disclosures of which are incorporated herein by reference as if set forth in full.

TECHNICAL FIELD

This disclosure generally relates to systems, methods, and devices for wireless communications and, more particularly, availability indication for uplink location measurement report (LMR) feedback.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 4A-4B depict illustrative schematic diagrams for measurement report feedback.

DETAILED DESCRIPTION

Figure 1:
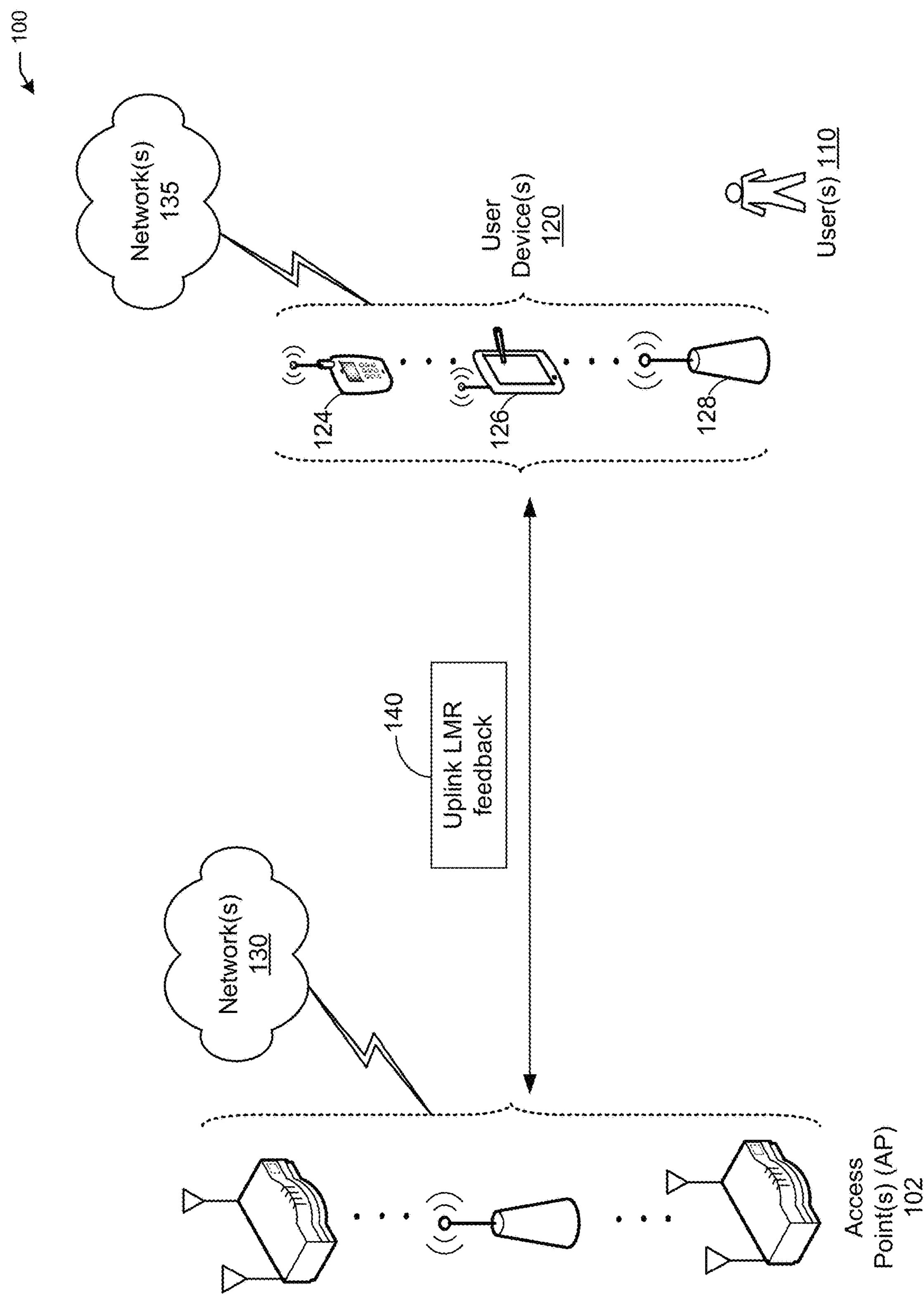
FIG. 1 depicts a diagram illustrating an example network environment of illustrative uplink location measurement report (LMR) feedback system, in accordance with one or more example embodiments of the present disclosure.

Example embodiments described herein provide certain systems, methods, and devices, for Signaling Schedule for Location Measurement Feedback Report in WLAN.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

In the development of IEEE 802.11az, the IEEE task group (TGaz) agreed that the multi-user (MU) measurement and measurement report feedback are scheduled based on the availability window. In each availability window, the station device (STA) and access point (AP) can perform polling, measurement or measurement feedback, and a single availability window can include multiple transmit opportunities (TXOPs). The AP and STA can decide the availability windows in the negotiation phase.

For the AP-to-STA LMR feedback, based on the AP's time of arrival (ToA) computation capability and the number of STAs involved in the measurement, the AP can use trigger frame or null data packet announcement (NDPA) to indicate whether the LMR packet is in the same availability window as the measurement, such that the STA may decide whether to stay awake in the availability window to wait for the LMR feedback or to switch to the doze state for power save and wake up again in the next availability window. But for the STA-to-AP LMR feedback, the AP needs to use a trigger frame to request multiple STAs to send the LMR at the same time. Since the STAs may have different computation capability and need a different amount of time for ToA calculation, the AP may only trigger the STAs whose ToA is ready to send the uplink LMR feedback, such that the medium usage efficiency can be guaranteed. To achieve this goal, the AP should clearly know when each STA's ToA or LMR is ready.

Example embodiments of the present disclosure relate to systems, methods, and devices for uplink location measurement report (LMR) feedback.

In one embodiment, an uplink LMR feedback system may facilitate a mechanism for MU fine timing measurement (FTM) ranging protocol (e.g., HEz), to enable the AP to allocate uplink (UL) resources to the STA only when the results for the STA-to-AP LMR are available once an allocation is made (preventing needless medium waste), while avoiding the AP from the need to manage different STA implementations with different processing latency. This may be true to both single user (SU) and MU sequences.

In one embodiment, an 802.11az ranging mechanism requires that the initiator and the responder perform a negotiation during a negotiation phase before starting a measurement phase and then reporting the results. In the negotiation phase of 802.11az, the initiator sends an initiator FTM request (iFTMR) frame to the FTM responder to request the establishment of the ranging protocol instance. The iFTMR frame may include the necessary parameter elements that will be used in the ranging protocol, and FTM responder may response with an initiator FTM (iFTM) frame to indicate whether the parameter in the iFTMR frame can be supported or a modified set of parameters. It should be understood that although the FTM responder uses an initiator frame (e.g., iFTM), this is because the responder is initiating the FTM frame.

In one or more embodiments, for the MU scenario, the initiator is STA and AP is the responder. Ranging parameters field of the iFTMR frame includes the periodic availability window schedule request, and the ranging parameters of iFTM frame may include the responder's periodic availability window schedule assignment and the downlink LMR types (e.g., immediate or delayed), which indicates to the initiator when it can expect to receive the downlink LMR frame from the responder (e.g., AP-to-STA LMR frame). For the uplink LMR feedback, the responder needs to send the trigger frame to multiple initiators to solicit the LMR. Therefore, before sending the trigger frame, the responder would know which initiators' LMRs are ready.

In this case, the initiator may include a status of the LMR (e.g., STA-to-AP LMR frame) in a ranging parameters field of the iFTMR frame, which is sent from the initiator to the responder during negotiation. That is the initiator may include the ranging parameters field to indicate whether the uplink LMR frame, comprising the LMR results, is ready in the current availability window or in a future availability window. Also, the ranging parameters field may also include information associated with whether the initiator is willing to report the LMR to the responder. The ranging parameters field may assist the responder to determine when to send the trigger frame to pull the LMR frame from the initiator before this expiration time of the LMR results (e.g., a computed ToA value).

In one embodiment, an uplink LMR feedback system may provide that in the ranging parameters field, a single bit may be defined to indicate whether the responder will request the uplink LMR from the initiator. This single bit may also be used by the initiator to indicate whether it intends to share or is willing to share the LMR with the responder. For example, if the initiator refuses to share the LMR information with the responder, the responder may choose not to provide the ranging service to the initiator. This LMR sharing bit may be applied to either HEz or VHTz.

In one embodiment, after the negotiation, the AP knows exactly when each STA's uplink LMR will be ready, such that the AP can schedule the trigger frame for LMR feedback into different availability window to request the STA to transmit the LMR frame. If an STA knows when the AP will request it to send the LMR feedback, the STA can decide to remain active in this availability window or switch to doze state to save power or move to another channel.

In one or more embodiments, the iFTMR frame may include the STA's preferred availability windows, and for the uplink LMR feedback, for simplicity, the STA may only need to report the uplink LMR feedback type to the AP. For example, the immediate feedback means the LMR is ready within the same availability window as the measurement and the delayed LMR feedback indicates the LMR will be ready in the next availability window following the measurements. In other words, for immediate feedback, the LMR carries measurement results of a current round, while for delayed feedback the LMR carries measurement results of a previous round.

In one or more embodiments, in the ranging parameters field of the iFTMR, an LMR type field may be added and when the STA sends the iFTMR frame, it can set this field accordingly. For example, if this field equals to 1, it indicates the STA can send the LMR feedback in the same availability window as measurement (immediate feedback), and if this field is 0, it means that the STA will send the LMR feedback in the next availability window following the measurement sequence (delayed feedback). Similarly, for the SU scenario, in the ranging parameters field of the iFTMR, a LMR type field may be added, and if this field is set to 1, it means the initiator (STA) may send immediate feedback to responder (AP), which is in the same TxOP as the measurement sequence. If this field is set to 0, it indicates the STA may send delayed feedback to AP, which is in a different TxOP as the measurement sequence.

In one embodiment, an uplink LMR feedback system may improve the AP's scheduling efficiency for uplink LMR feedback and enable the STAs to save more power as the scheduling for STA-to-AP LMR does not require a separate availability window. It avoids the need for the AP to manage a separate timer for each STA due to different latencies. It creates single sounding sequences for MU and SU. As sounding sequences are RRT critical processes implemented many times in hardware or hardware/firmware combinations, it simplifies the std. implementation.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment, in accordance with one or more example embodiments of the present disclosure. Wireless network 100 may include one or more user devices 120 and one or more access point(s) (AP) 102, which may communicate in accordance with IEEE 802.11 communication standards. The user device(s) 120 may be mobile devices that are non-stationary (e.g., not having fixed locations) or may be stationary devices.

Figure 8:
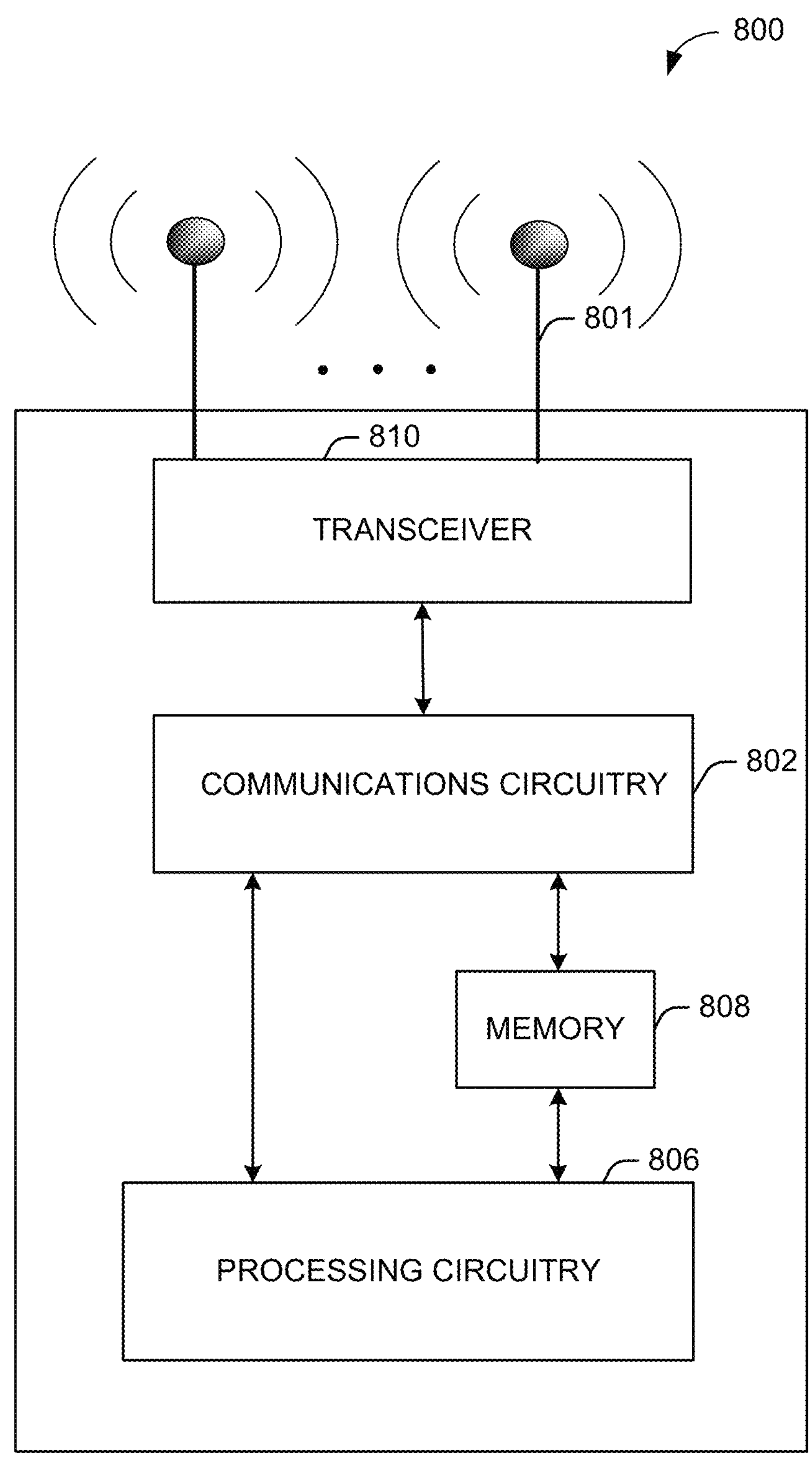
FIG. 8 depicts a functional diagram of an example communication station, in accordance with one or more example embodiments of the present disclosure.
Figure 9:
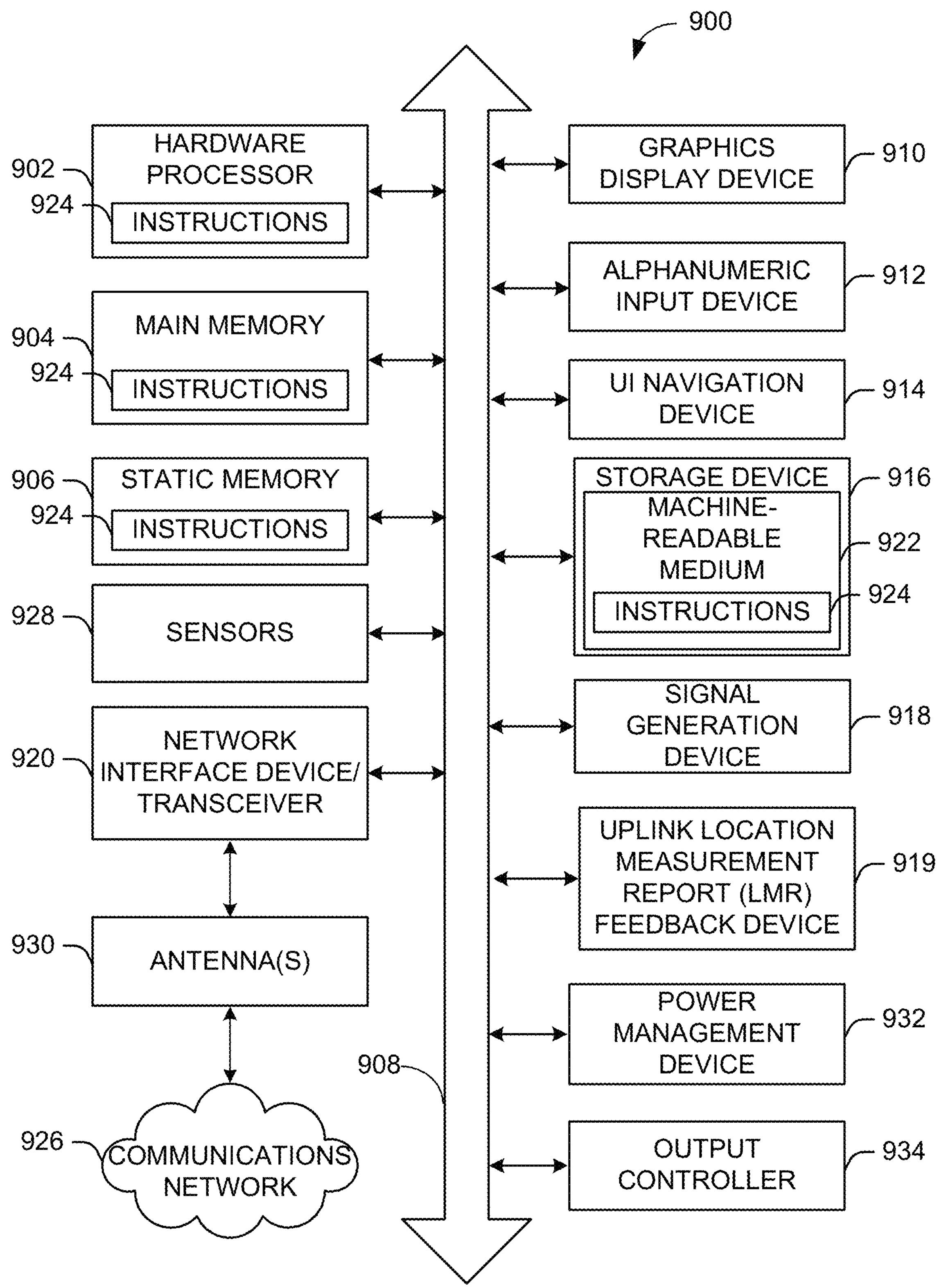
FIG. 9 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

Some embodiments may be used in conjunction with devices and/or networks operating in accordance with existing. Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, an AP 102 may perform sounding measurements with one or more user devices 120 by implementing an uplink LMR feedback 140, in accordance with one or more example embodiments of the present disclosure. It is understood that the above descriptions are for purposes of illustration and are not meant to be limiting.

Figure 2:
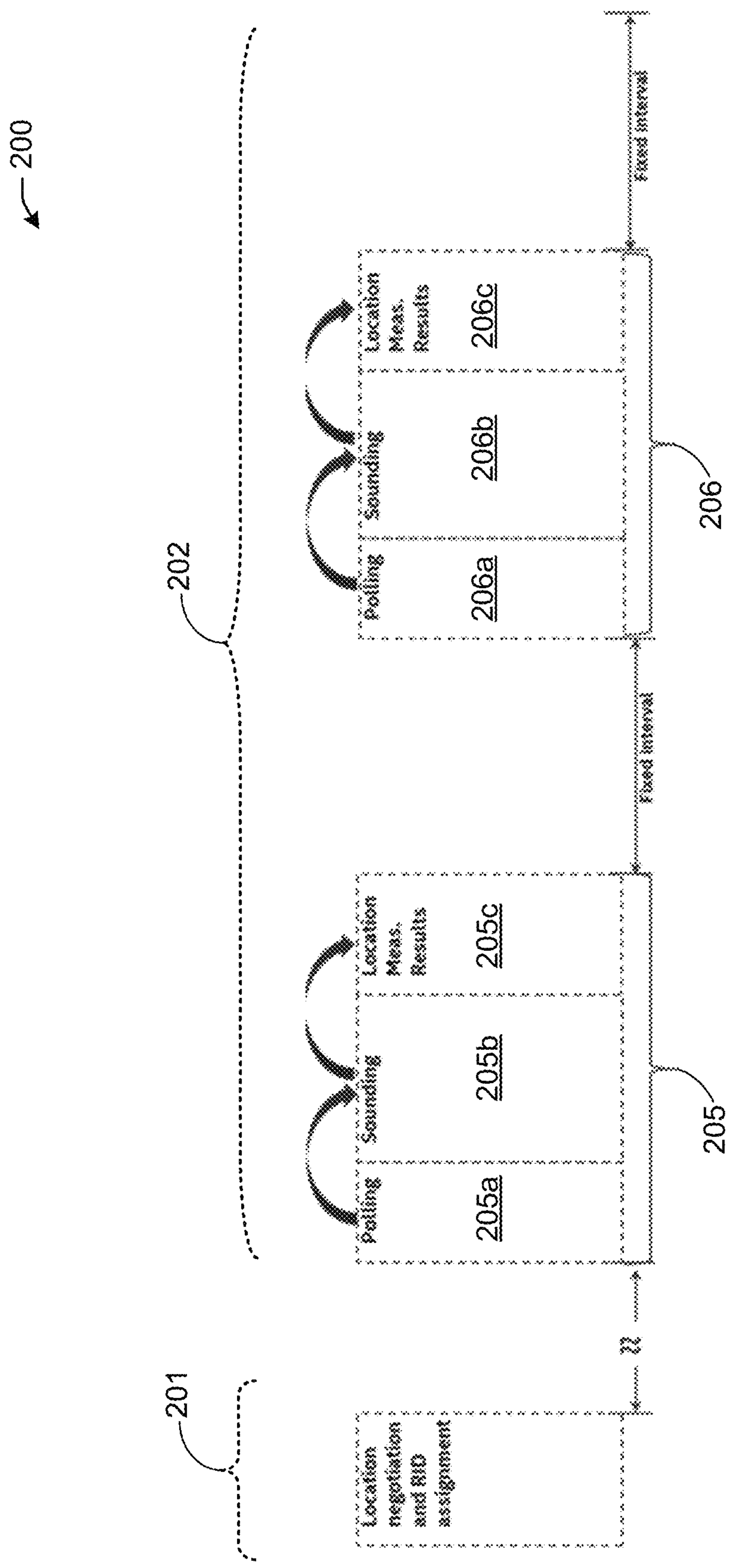
FIG. 2 depicts an illustrative schematic diagram for recurring availability windows.

FIG. 2 depicts an illustrative schematic diagram 200 for recurring availability windows.

In the development of IEEE 802.11az, the IEEE task group (TGaz) agreed that the multi-user (MU) measurement and measurement report feedbacks are scheduled based on the availability window. In each availability window, the station device (STA) and access point (AP) can perform polling, measurement or measurement feedback, and a single availability window can include multiple transmit opportunities (TXOPs). The AP and STA can decide the availability windows in the negotiation phase.

Referring to FIG. 2, there is shown a ranging mechanism that may comprise a negotiation phase 201 and a measurement phase 202. The negotiation phase 201 may comprise location negotiation and assignment of identification such as a ranging ID (RID). During the negotiation phase 201, one or more FTM frames (not shown here) may be exchanged between the initiator device and the responder device. The measurement phase 202 comprises one or more rounds of measurements that include one or more parts associated with a round of measurement. For example, during a round N of measurement which may be performed during an availability window 205, the initiator and the responder may perform one or more of a polling part 205_a_, a sounding part 205_b_, and/or a location measurement results part 205_c_. An is an integer and represents the $N^{th}$ round of measurements within the measurement phase 202. In the example of FIG. 2, there is also shown a next availability window 206, which is a time frame within which the N+1 round of measurement is performed within the measurement of a steel tube. It should be understood that there may be a fixed interval between each of the availability windows (e.g., between availability window 205 and availability window 206, etc.). During the availability window 206, similar to availability window 205, the initiator and the responder may perform one or more of a polling part 206_a_, a sounding part 206_b_, and/or a location measurement results part 206_c_.

Figure 3:
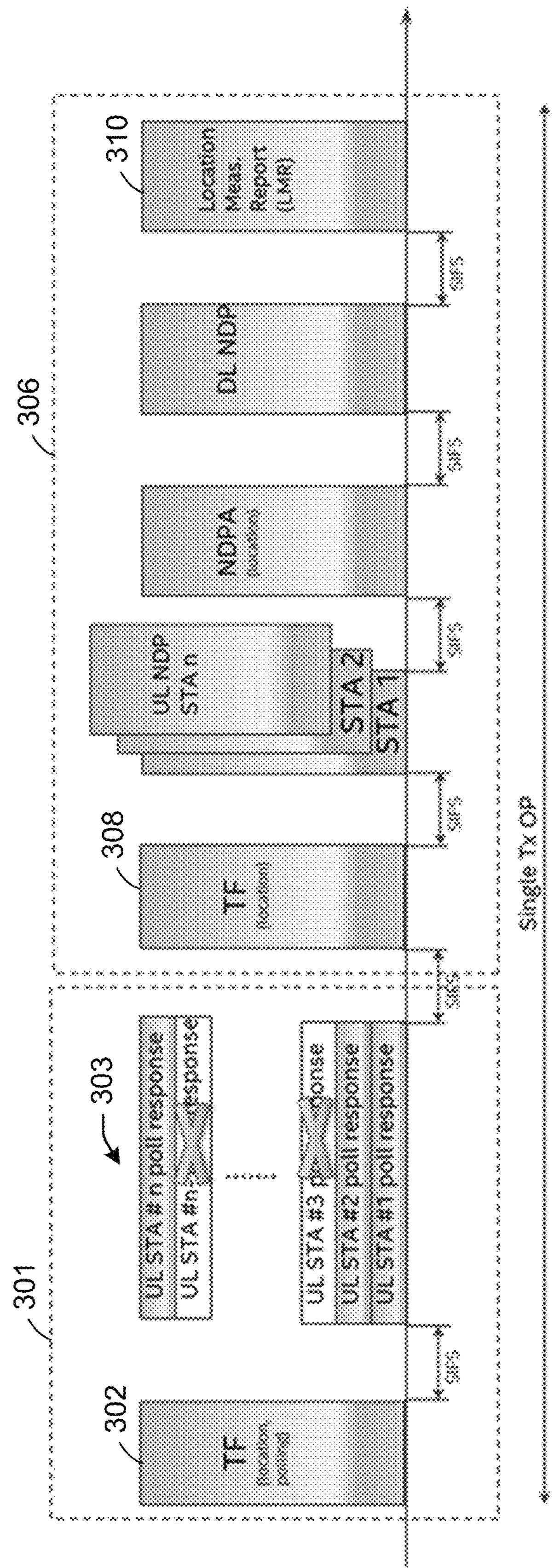
FIG. 3 depicts an illustrative schematic diagram for a polling phase and a measurement sequence.

FIG. 3 depicts an illustrative schematic diagram 300 for a polling phase and a measurement sequence.

Referring to FIG. 3, there is shown an example of the polling phase 301 and measurement sequence 306. In the polling phase 301, only the STAs that are ready for measurement will send a positive response and in the measurement sequence 306, the AP will only exchange the UL and DL NDPs with the STAs whose response is positive in the polling phase.

In the polling phase 301, the AP sends a trigger frame 302 to one or more STAs (e.g., STA #1, STA #2, STA #3, STA #n-1, STA #n). The STAs that would want to perform measurements may respond by sending their respective responses 303. In this example, STA #1, STA #2, and STA #n are shown to have response frames sent to the poll request. Therefore, during the measurement phase, the AP and the STAs that responded during the polling phase 301, may continue to perform the measurements. For example, as shown in FIG. 3, the AP may send a different trigger frame than the one sent in the polling phase 301. The trigger frame in the measurement sequence 306 is shown as trigger frame 308 which is meant to allocate resources to the STAs that responded in the polling phase 301. The STAs would then send their UL NDPs in order to perform the location measurements. AP would then send an NDPA which then is followed by an NDPA from the AP to the STAs. At the end of the measurement sequence 306, the AP and/or the STAs would exchange LMR report 310.

FIGS. 4A-4B depict illustrative schematic diagrams for measurement report feedback.

Referring to FIG. 4A, there is shown that the measurement report feedback could be in the same availability window 401 as the measurement.

Referring to FIG. 4B, there is shown that the measurement report feedback could be in a following availability window 412 compared to the availability window 411 where the measurement was performed.

In FIG. 4A, there is shown the polling phase 402, which is followed by the measurement phase 404, and then the AP would send its LMR feedback to the STAs (e.g., AP-to-STA LMR), and then the STAs would send their respective LMR feedbacks to the AP (e.g., STA-to-AP LMR).

In FIG. 4A, negotiation is performed during availability window 410, the polling phase and the measurement phase(s) are performed during availability window 411, and the LMR frames are exchanged between the AP and the STAs during availability 412.

For the AP-to-STA LMR feedback, based on the AP's time of arrival (ToA) computation capability and the number of STAs involved in the measurement, the AP can use trigger frame or null data packet announcement (NDPA) to indicate whether the LMR packet is in the same availability window as the measurement, such that the STA may decide whether to stay awake in the availability window to wait for the LMR feedback or to switch to the doze state for power save and wake up again in the next availability window. But for the STA-to-AP LMR feedback, the AP needs to use a trigger frame to request multiple STAs to send the LMR at the same time. Since the STAs may have different computation capability and need a different amount of time for ToA calculation, the AP may only trigger the STAs whose ToA is ready to send the uplink LMR feedback, such that the medium usage efficiency can be guaranteed. To achieve this goal, the AP should clearly know when each STA's ToA or LMR is ready.

Figure 5:
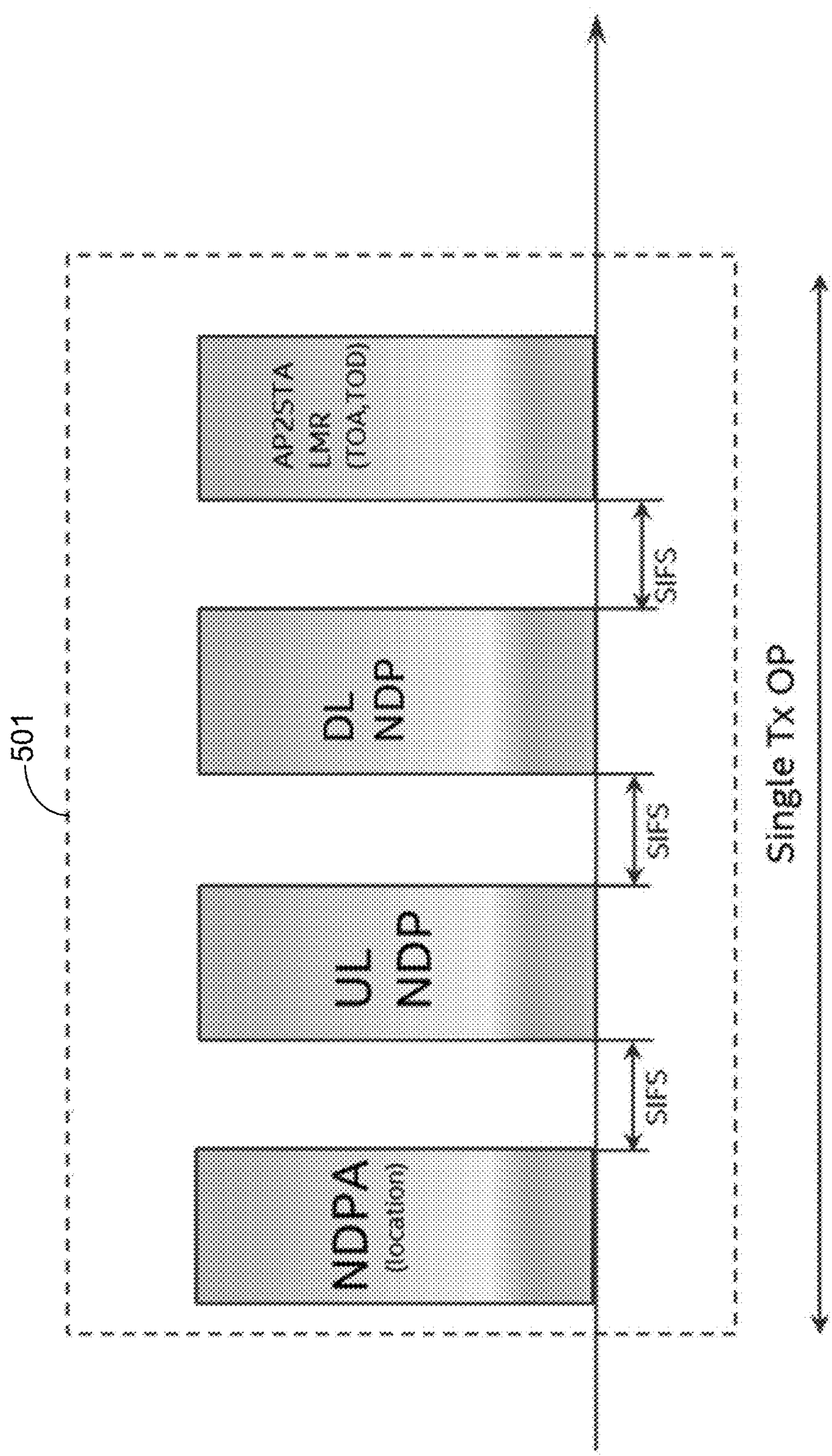
FIG. 5 depicts an illustrative schematic diagram for uplink LMR feedback, in accordance with one or more example embodiments of the present disclosure.

FIG. 5 depicts an illustrative schematic diagram 500 for uplink LMR feedback, in accordance with one or more example embodiments of the present disclosure.

Referring to FIG. 5, there is shown a current SU ranging sounding sequence 501.

At 2.4 or 5 GHz, the 802.11az supports three ranging sequences: FTM (REVmc) for legacy purposes, VHTz (SU scenario), and HEz (MU scenario). In the negotiation phase of 802.11az, the FTM initiator sends the iFTMR frame to the FTM responder to request the establishment of the ranging protocol instance. The iFTMR frame may include the necessary parameter elements that will be used in the ranging protocol, and FTM responder may respond with an iFTM frame to indicate whether the parameter in the iFTMR frame can be supported or a modified set of parameters.

In the current design of 802.11az, for the MU scenario, the initiator is STA and AP is the responder. The HEz-specific subelement of iFTMR frame includes the periodic availability window schedule request, and the ranging parameters field of the iFTM frame includes the responder's periodic availability window schedule assignment and the downlink LMR types: immediate or delayed, which indicates to the initiator when it can expect to receive the downlink LMR frame from the responder. For the uplink LMR feedback, since the responder needs to send the trigger frame to multiple initiators to solicit the LMR; and therefore before sending the trigger frame, the responder should know which initiators' LMRs are ready.

The example of FIG. 5 shows a method to enable the uplink LMR feedback from the STA to AP. The concept of transmitting the STA-to-AP LMR in the same TxOP as that of the sounding also carries over to SU operation, which is shown in FIG. 6.

It is understood that the above descriptions are for purposes of illustration and are not meant to be limiting.

Figure 6:
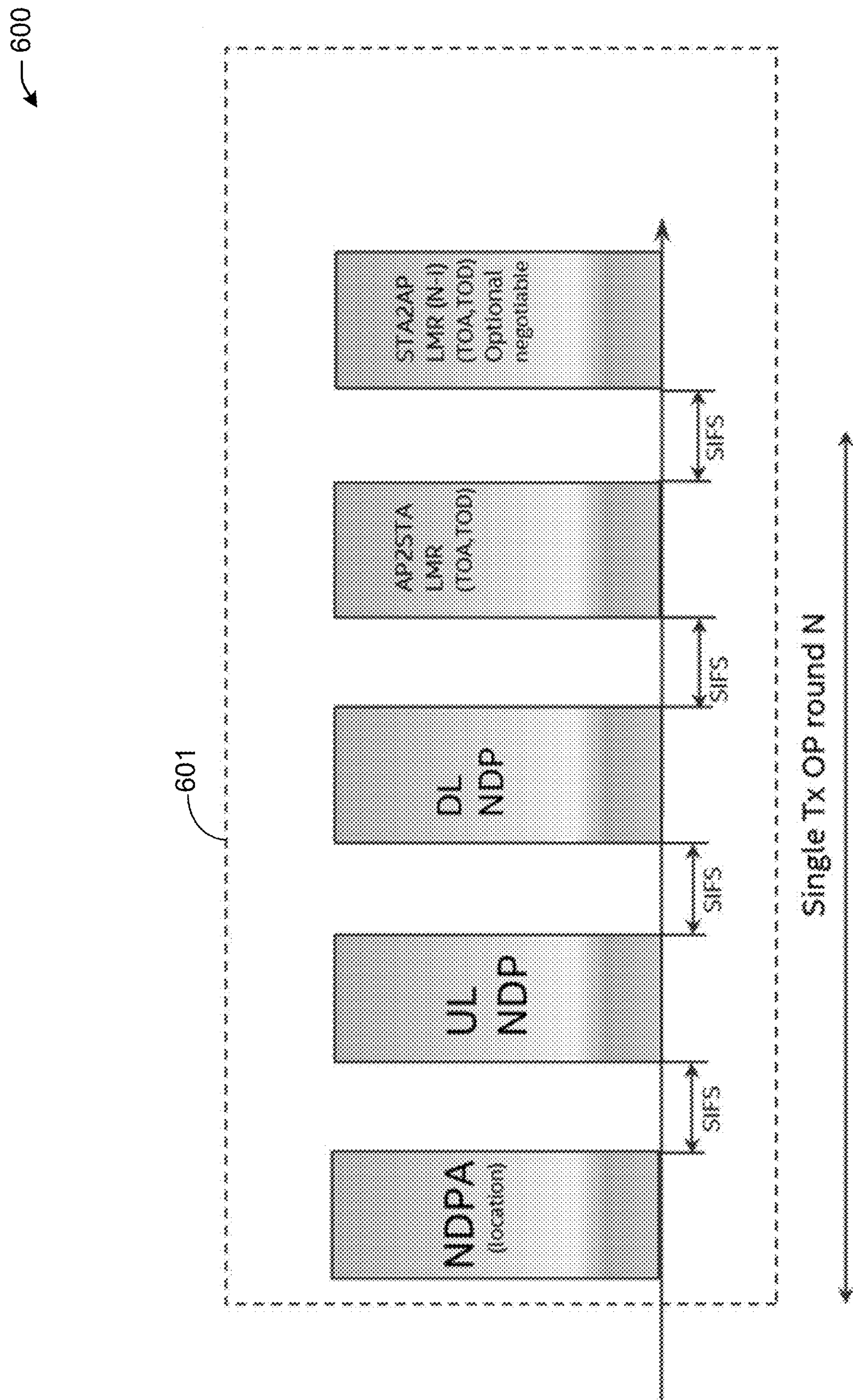
FIG. 6 depicts an illustrative schematic diagram for uplink LMR feedback, in accordance with one or more example embodiments of the present disclosure.

FIG. 6 depicts an illustrative schematic diagram 600 for uplink LMR feedback, in accordance with one or more example embodiments of the present disclosure.

Referring to FIG. 6, there is shown an SU ranging sounding sequence 601 with STA-to-AP reporting of round N-i.

In one embodiment, as the iSTA (normally the non-AP STA) is the initiating entity of each sounding instance in SU, the iSTA is merely required to initiate a new measurement instant N only once the result of round N-i are completed.

In one embodiment, an initiator (e.g., an STA) may report the LMR ready to the responder (e.g., an AP). In this case, the initiator may include a status of the LMR (e.g., STA-to-AP LMR) in a ranging parameters field of the iFTMR frame. That is the initiator may include the ranging parameters field to indicate whether the uplink LMR frame, comprising the LMR results, is ready in the current availability window or in a future availability window. Also, the ranging parameters field may also include information associated with whether the initiator is willing to report the LMR to the responder. The ranging parameters field may assist the responder to determine when to send the trigger frame to pull the LMR frame from the initiator before this expiration time of the LMR results (e.g., a computed ToA value).

In one embodiment, an uplink LMR feedback system may provide that in the ranging parameter field, a single bit may be defined to indicate whether the responder will request the uplink LMR from the initiator. This single bit may also be used by the initiator to indicate whether it intends to share or is willing to share the LMR with the responder. For example, the reserved bit in the ranging parameters field may be used for this purpose. If the initiator refuses to share the LMR information with the responder, the responder may choose not to provide the ranging service to the initiator. This LMR sharing bit may be applied to either HEz or VHTz. It is understood that the above descriptions are for purposes of illustration and are not meant to be limiting.

In one embodiment, after the negotiation, the AP knows exactly when each STA's uplink LMR will be ready, such that the AP can schedule the trigger frame for LMR feedback into different availability window to request the STA to transmit the LMR frame. If an STA knows when the AP will request it to send the LMR feedback, the STA can decide to remain active in this availability window or switch to doze state to save power or move to another channel.

Another consideration for the design of the availability window is that the AP may set the availability window long enough, such that the AP may always finish the receiving of the uplink LMR feedback from STAs in the same window as the measurement sequence, and in this way, the latency between the measurement sequence and the LMR feedback may be minimized.

In one embodiment, an STA (e.g., an initiator) may report the LMR feedback type (immediate or delayed) to AP (e.g., a responder). For immediate feedback, the LMR carries measurement results of a current round, while for delayed feedback the LMR carries measurement results of a previous round.

In one or more embodiments, the iFTMR frame may include the STA's preferred availability windows, and for the uplink LMR feedback, for simplicity, the STA may only need to report the uplink LMR feedback type to the AP. For example, the immediate feedback means the LMR is ready within the same availability window as the measurement and the delayed LMR feedback indicates the LMR will be ready in the next availability window following the measurements. In other words, for immediate feedback, the LMR carries measurement results of a current round, while for delayed feedback the LMR carries measurement results of a previous round.

In the ranging parameters field of the iFTMR, an LMR type field may be added and when the STA sends the iFTMR frame, it can set this field accordingly. For example, if this field equals to 1, it indicates the STA can send the LMR feedback in the same availability window as measurement (immediate feedback), and if this field is 0, it means that the STA will send the LMR feedback in the next availability window following the measurement sequence (delayed feedback). Similarly, for the SU scenario, in the ranging parameters field of the iFTMR, a LMR type field may be added, and if this field is set to 1, it means the initiator (STA) may send immediate feedback to responder (AP), which is in the same TxOP as the measurement sequence. If this field is set to 0, it indicates the STA may send delayed feedback to AP, which is in a different TxOP as the measurement sequence, and for this case the STA also indicates the MinToAReady and MaxToAAvailable parameters to AP, which denotes when the STA's LMR is ready and how long the STA will store the LMR respectively.

In one or more embodiments, for the MU scenario, in the availability window, if the STA's LMR feedback is immediate, after the short inter-frame space (SIFS) of sending out the DL NDP of measurement sequence, the AP may send trigger frame to solicit the LMR from STA, and if the STA's LMR feedback is delayed, in the next availability window following the measurement sequence, the AP may first perform the polling phase to check whether the STAs are ready for measurement or LMR feedback. If the STA's response is positive, then the AP can send the trigger frame to solicit the uplink LMR from STA within this availability window. The AP may request the uplink LMR either before or after the measurement sequence in this availability window. After the STA sending out the LMR frame, the STA can flush out the memory.

It is understood that the above descriptions are for purposes of illustration and are not meant to be limiting.

Figure 7A:
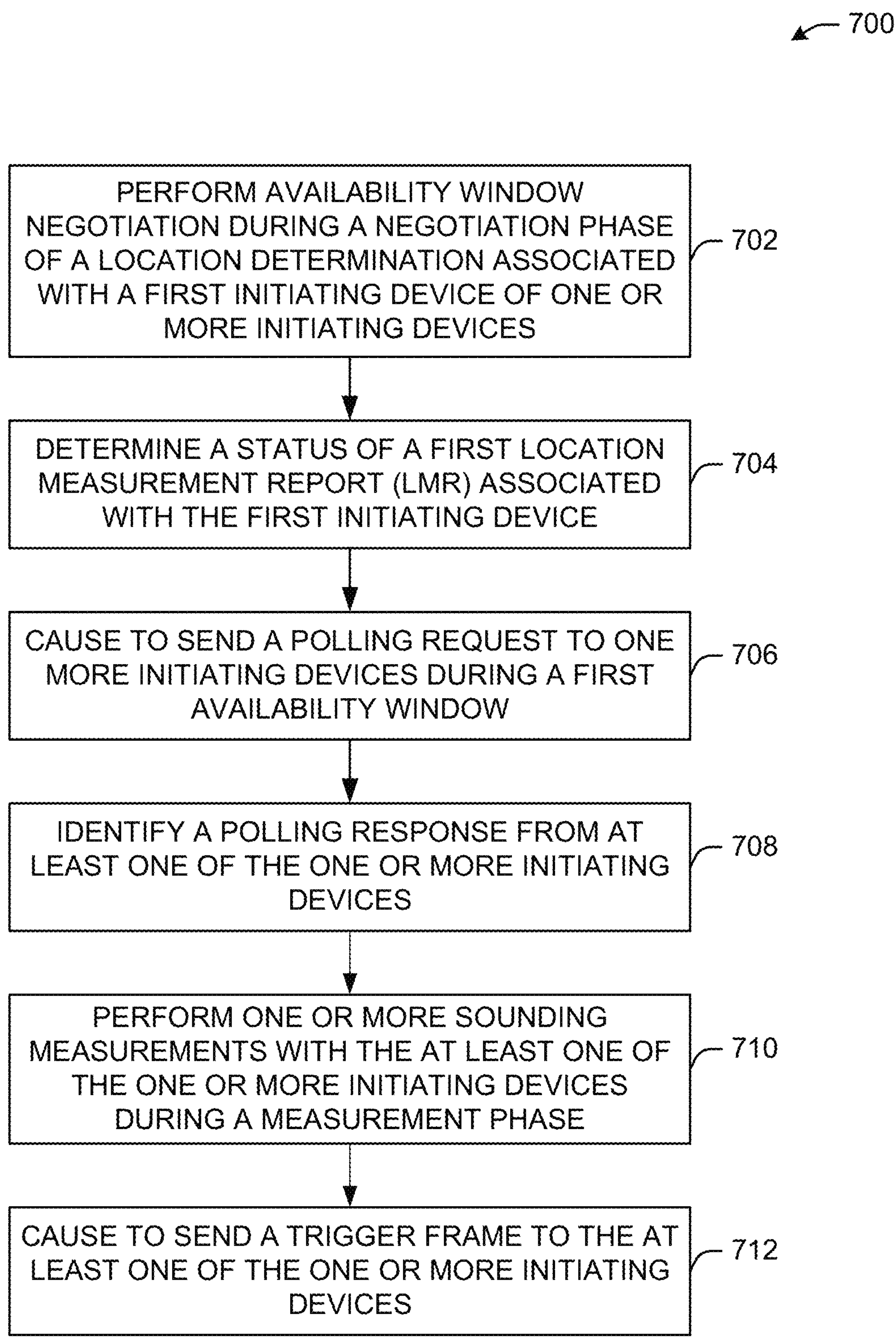
FIG. 7A depicts a flow diagram of an illustrative process for an uplink LMR feedback system, in accordance with one or more embodiments of the disclosure.
Figure 7B:
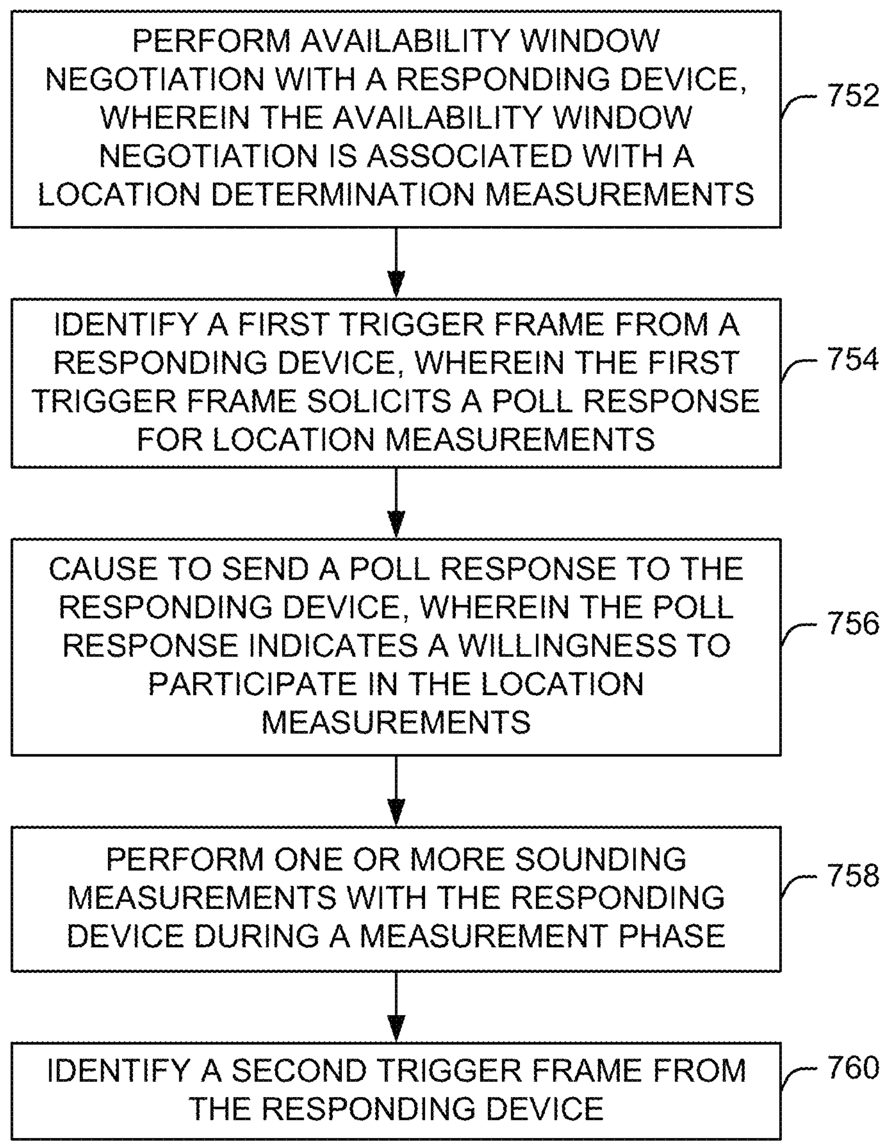
FIG. 7B depicts a flow diagram of an illustrative process for an uplink LMR feedback system, in accordance with one or more embodiments of the disclosure.

FIG. 7 illustrates a flow diagram of illustrative process 700 for an illustrative uplink LMR feedback system, in accordance with one or more example embodiments of the present disclosure.

At block 702, a responding device (e.g., the AP 102 of FIG. 1) may perform availability window negotiation during a negotiation phase of a location determination associated with a first initiating device of one or more initiating devices (e.g., the user device(s) 120 of FIG. 1).

At block 704, the device may determine a status of a first location measurement report (LMR) associated with the first initiating device.

At block 706, the device may cause to send a polling request to one more initiating devices during a first availability window.

At block 708, the device may identify a polling response from at least one of the one or more initiating devices.

At block 710, the device may perform one or more sounding measurements with the at least one of the one or more initiating devices during a measurement phase.

At block 712, the device may cause to send a trigger frame to the at least one of the one or more initiating devices.

It is understood that the above descriptions are for purposes of illustration and are not meant to be limiting.

FIG. 7 illustrates a flow diagram of illustrative process 750 for an illustrative uplink LMR feedback system, in accordance with one or more example embodiments of the present disclosure.

At block 752, a device (e.g., the user device(s) 120) may perform availability window negotiation with a responding device, wherein the availability window negotiation is associated with a location determination measurements At block 754, the device may identify a first trigger frame from a responding device, wherein the first trigger frame solicits a poll response for location measurements.

At block 756, the device may cause to send a poll response to the responding device, wherein the poll response indicates a willingness to participate in the location measurements.

At block 758, the device may perform one or more sounding measurements with the responding device during a measurement phase.

At block 760, the device may identify a second trigger frame from the responding device.

It is understood that the above descriptions are for purposes of illustration and are not meant to be limiting.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The transceiver 810 may be a device comprising both a transmitter and a receiver that are combined and share common circuitry (e.g., communication circuitry 802). The communication circuitry 802 may include amplifiers, filters, mixers, analog to digital and/or digital to analog converters. The transceiver 810 may transmit and receive analog or digital signals. The transceiver 810 may allow reception of signals during transmission periods. This mode is known as full-duplex and may require the transmitter and receiver to operate on different frequencies to minimize interference between the transmitted signal and the received signal. The transceiver 810 may operate in a half-duplex mode, where the transceiver 810 may transmit or receive signals in one direction at a time.

The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1, 2, 3, 4A, 4B, 5, 6, 7A, and 7B.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touchscreen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touchscreen display. The machine 900 may additionally include a storage device (i.e., drive unit) 916, a signal generation device 918 (e.g., a speaker), a uplink LMR feedback device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The uplink LMR feedback device 919 may carry out or perform any of the operations and processes (e.g., processes 700 and 750) described and shown above.

It is understood that the above are only a subset of what the uplink LMR feedback device 919 may be configured to perform and that other functions included throughout this disclosure may also be performed by the uplink LMR feedback device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a responding device comprising processing circuitry coupled to storage, the processing circuitry configured to: perform availability window negotiation during a negotiation phase of a location determination associated with a first initiating device of one or more initiating devices; determine a status of a first location measurement report (LMR) associated with the first initiating device; cause to send a polling request to one more initiating devices during a first availability window; identify a polling response from at least one of the one or more initiating devices; perform one or more sounding measurements with the at least one of the one or more initiating devices during a measurement phase; and cause to send a trigger frame to the at least one of the one or more initiating devices.

Example 2 may include the device of example 1 and/or some other example herein, wherein the status of the first LMR may be a delayed LMR or an immediate LMR.

Example 3 may include the device of example 1 and/or some other example herein, wherein a delayed LMR may be an LMR sent in a next availability window, and wherein an immediate LMR may be an LMR sent in a same availability window of the measurement availability window.

Example 4 may include the device of example 1 and/or some other example herein, wherein to cause to send the trigger frame to the at least one of the one or more imitating devices further comprises determining that at least one of the one or more initiating devices are ready to send a corresponding LMR.

Example 5 may include the device of example 1 and/or some other example herein, wherein to perform the availability window negotiation comprises the processing circuitry to be further configured to exchange fine timing measurement (FTM) frames, the FTM frames comprising an initiating FTM request.

Example 6 may include the device of example 5 and/or some other example herein, wherein the initiating FTM request comprises timing information associated with when the first LMR associated with the first initiating LMR.

Example 7 may include the device of example 6 and/or some other example herein, wherein the timing information includes a time offset of when the first LMR will be sent and a time duration of how long the first LMR will be valid.

Example 8 may include the device of example 6 and/or some other example herein, wherein the initiating FTM request comprises a ranging parameters field, wherein the ranging parameter field indicates a willingness to report the first LMR.

Example 9 may include the device of example 8 and/or some other example herein, wherein the ranging parameters field may be set to 1 to indicate the first initiating device may be willing to report the first LMR to the responding device.

Example 10 may include the device of example 8 and/or some other example herein, wherein the ranging parameters field may be set to 0 to indicate the first initiating device may be not ready to report the first LMR to the responding device.

Example 11 may include the device of example 1 and/or some other example herein, further comprising a transceiver configured to transmit and receive wireless signals.

Example 12 may include the device of example 11 and/or some other example herein, further comprising an antenna coupled to the transceiver.

Example 13 may include a non-transitory computer-readable medium storing computer-executable instructions which when executed by one or more processors result in performing operations comprising: performing availability window negotiation with a responding device, wherein the availability window negotiation may be associated with a location determination measurements; identifying a first trigger frame from a responding device, wherein the first trigger frame solicits a poll response for location measurements; causing to send a poll response to the responding device, wherein the poll response indicates a willingness to participate in the location measurements; performing one or more sounding measurements with the responding device during a measurement phase; and identifying a second trigger frame from the responding device.

Example 14 may include the non-transitory computer-readable medium of example 13 and/or some other example herein, wherein the second trigger frame allocates resources for one or more devices to send their corresponding uplink location measurement report (LMR) to the responding device.

Example 15 may include the non-transitory computer-readable medium of example 13 and/or some other example herein, wherein identifying the second trigger frame may be based on a negotiation phase of the availability window negotiation.

Example 16 may include the non-transitory computer-readable medium of example 13 and/or some other example herein, wherein the operations further comprise causing to send an initiating fine timing measurement request (iFTMR) frame during a negotiation phase, wherein the iFTMR comprises a ranging parameters field that indicates an immediate location measurement report (LMR) or a delayed LMR.

Example 17 may include the non-transitory computer-readable medium of example 13 and/or some other example herein, wherein the operations further comprise causing to send an initiating fine timing measurement request (iFTMR) frame during a negotiation phase, wherein the iFTMR comprises a feedback bit that indicates a willingness to report a location measurement report (LMR).

Example 18 may include a method comprising: performing, by one or more processors of a responding device, availability window negotiation during a negotiation phase of a location determination associated with a first initiating device of one or more initiating devices; determine a status of a first location measurement report (LMR) associated with the initiating device; cause to send a polling request to one more initiating devices during a first availability window; identify a polling response from at least one of the one or more initiating devices; perform one or more sounding measurements with the at least one of the one or more initiating devices during a measurement phase; and cause to send a trigger frame to the at least one of the one or more initiating devices.

Example 19 may include the method of example 18 and/or some other example herein, wherein the status of the first LMR may be a delayed LMR or an immediate LMR.

Example 20 may include the method of example 18 and/or some other example herein, wherein a delayed LMR may be an LMR sent in a next availability window, and wherein an immediate LMR may be an LMR sent in a same availability window of the measurement availability window.

Example 21 may include an apparatus comprising means for: performing availability window negotiation during a negotiation phase of a location determination associated with a first initiating device of one or more initiating devices; determining a status of a first location measurement report (LMR) associated with the first initiating device; causing to send a polling request to one more initiating devices during a first availability window; identifying a polling response from at least one of the one or more initiating devices; performing one or more sounding measurements with the at least one of the one or more initiating devices during a measurement phase; and causing to send a trigger frame to the at least one of the one or more initiating devices.

Example 22 may include the apparatus of example 21 and/or some other example herein, wherein the status of the first LMR may be a delayed LMR or an immediate LMR.

Example 23 may include the apparatus of example 21 and/or some other example herein, wherein a delayed LMR may be an LMR sent in a next availability window, and wherein an immediate LMR may be an LMR sent in a same availability window of the measurement availability window.

Example 24 may include the apparatus of example 21 and/or some other example herein, wherein to cause to send the trigger frame to the at least one of the one or more imitating devices further comprises determining that at least one of the one or more initiating devices are ready to send a corresponding LMR.

Example 25 may include the apparatus of example 21 and/or some other example herein, wherein the means for performing the availability window negotiation comprises means for exchanging fine timing measurement (FTM) frames, the FTM frames comprising an initiating FTM request.

Example 26 may include the apparatus of example 25 and/or some other example herein, wherein the initiating FTM request comprises timing information associated with when the first LMR associated with the first initiating LMR.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A responder communication device, the device comprising processing circuitry coupled to storage, the processing circuitry configured to:

establish connections with one or more initiator devices;

receive a ranging null data packet announcement frame (NDPA) from an initiator communication device of the one or more initiator communication devices during a non-trigger based (TB) measurement sounding phase;

receive an Initiator-to-Responder null data packet (NDP) (I2R NDP) frame from the initiator communication device;

transmit a Responder-to-Initiator NDP (R2I NDP) frame to the initiator communication device during the non-TB measurement sounding phase;

perform time-of-flight (ToF) measurements by capturing timestamps of the NDP frames;

determine whether to acknowledge the receipt of a location measurement report (LMR) frame from the initiator communication device, based on an immediate feedback or a delayed feedback; and assign timing information in a ranging parameters field in an initiator fine timing measurement request (iFTMR) to account for measurement duration, wherein the initiator device includes a status of the LMR in the ranging parameters field of the iFTMR frame, indicating whether an uplink LMR frame, comprising the LMR results, is ready in a current availability window or in a future availability window, and wherein a single bit in the ranging parameters field indicates whether the responder communication device will request the uplink LMR from the initiator device and whether the initiator device intends to share the LMR with the responder communication device.

2. The responder communication of claim 1, wherein the processing circuitry is further configured to transmit a trigger frame to the initiator communication device to solicit the LMR frame based on the immediate or delayed uplink LMR feedback type.

3. The responder communication of claim 2, wherein the processing circuitry is further configured to manage a scheduling of the trigger frame for LMR feedback by incorporating different availability windows according to the initiator device's preferred availability windows.

4. The responder communication of claim 1, wherein the processing circuitry is further configured to receive an initiator fine timing measurement request (iFTMR) frame from the initiator communication device indicating a request for establishment of a ranging protocol instance.

5. The responder communication of claim 1, wherein for the immediate feedback in the LMR frame carries measurement results of a current round, while for the delayed feedback, the LMR frame carries measurement results of a previous round.

6. A non-transitory computer-readable medium storing computer-executable instructions which when executed by one or more processors of a responder communication device result in performing operations comprising:

establishing connections with one or more initiator devices;

receiving a ranging null data packet announcement frame (NDPA) from an initiator communication device of the one or more initiator communication devices during a non-trigger based (TB) measurement sounding phase;

receiving an Initiator-to-Responder null data packet (NDP) (I2R NDP) frame from the initiator communication device;

transmitting a Responder-to-Initiator NDP (R2I NDP) frame to the initiator communication device during the non-TB measurement sounding phase;

performing time-of-flight (ToF) measurements by capturing timestamps of the NDP frames;

determining whether to acknowledge the receipt of a location measurement report (LMR) frame from the initiator communication device, based on an immediate feedback or a delayed feedback; and assign timing information in a ranging parameters field in an initiator fine timing measurement request (iFTMR) to account for measurement duration, wherein the initiator device includes a status of the LMR in the ranging parameters field of the iFTMR frame, indicating whether an uplink LMR frame, comprising the LMR results, is ready in a current availability window or in a future availability window, and wherein a single bit in the ranging parameters field indicates whether the responder communication device will request the uplink LMR from the initiator device and whether the initiator device intends to share the LMR with the responder communication device.

7. The non-transitory computer-readable medium of claim 6, wherein the operations further comprise transmitting a trigger frame to the initiator communication device to solicit the LMR frame based on the immediate or delayed uplink LMR feedback type.

8. The non-transitory computer-readable medium of claim 7, wherein the operations further comprise manage a scheduling of the trigger frame for LMR feedback by incorporating different availability windows according to the initiator device's preferred availability windows.

9. The non-transitory computer-readable medium of claim 6, wherein the operations further comprise receiving an initiator fine timing measurement request (iFTMR) frame from the initiator communication device indicating a request for establishment of a ranging protocol instance.

10. The non-transitory computer-readable medium of claim 6, wherein for the immediate feedback in the LMR frame carries measurement results of a current round, while for the delayed feedback, the LMR frame carries measurement results of a previous round.

11. A method comprising:

establishing, by one or more processors of a responder communication device, connections with one or more initiator devices;

receiving a ranging null data packet announcement frame (NDPA) from an initiator communication device of the one or more initiator communication devices during a non-trigger based (TB) measurement sounding phase;

receiving an Initiator-to-Responder null data packet (NDP) (I2R NDP) frame from the initiator communication device;

transmitting a Responder-to-Initiator NDP (R2I NDP) frame to the initiator communication device during the non-TB measurement sounding phase;

performing time-of-flight (ToF) measurements by capturing timestamps of the NDP frames; and determining whether to acknowledge the receipt of a location measurement report (LMR) frame from the initiator communication device, based on an immediate feedback or a delayed feedback; and assigning timing information in a ranging parameters field in an initiator fine timing measurement request (iFTMR) to account for measurement duration, wherein the initiator device includes a status of the LMR in the ranging parameters field of the iFTMR frame, indicating whether an uplink LMR frame, comprising the LMR results, is ready in a current availability window or in a future availability window, and wherein a single bit in the ranging parameters field indicates whether the responder communication device will request the uplink LMR from the initiator device and whether the initiator device intends to share the LMR with the responder communication device.

12. The method of claim 11, further comprising transmitting a trigger frame to the initiator communication device to solicit the LMR frame based on the immediate or delayed uplink LMR feedback type.

13. The method of claim 12, further comprising manage a scheduling of the trigger frame for LMR feedback by incorporating different availability windows according to the initiator device's preferred availability windows.

* * * * *